(12) United States Patent
Wang

(10) Patent No.: US 7,388,900 B2
(45) Date of Patent: Jun. 17, 2008

(54) ESTIMATION METHOD FOR SPACE CORRELATION CHARACTERISTICS OF NOISE IN A TIME SLOTTED CDMA SYSTEM

(75) Inventor: Yingmin Wang, Beijing (CN)

(73) Assignee: Da Tang Mobile Communications Equipment Co., Ltd. (CN)

( * ) Notice: Subject to any disclaimer, the term of this patent is extended or adjusted under 35 U.S.C. 154(b) by 313 days.

(21) Appl. No.: 11/175,119

(22) Filed: Jul. 5, 2005

(65) Prior Publication Data
US 2005/0286615 A1 Dec. 29, 2005

Related U.S. Application Data

(63) Continuation of application No. PCT/CN2004/000023, filed on Jan. 7, 2004.

(30) Foreign Application Priority Data
Jan. 7, 2003 (CN) ................. 03 1 14763

(51) Int. Cl.
*H04B 1/00* (2006.01)
(52) U.S. Cl. ............ 375/150; 375/130; 375/135; 375/136; 375/140; 375/146; 375/147
(58) Field of Classification Search ........... 375/130, 375/135–136, 140, 146–147, 149–150, 267, 375/264, 278, 295, 316, 341, 346–349, 107–109
See application file for complete search history.

(56) References Cited

U.S. PATENT DOCUMENTS 5,796,788 A 8/1998 Bottomley 6,904,107 B1 * 6/2005 Rached et al. ............ 375/343
6,907,270 B1 * 6/2005 Blanz ...................... 455/562.1
7,133,459 B2 * 11/2006 Onggosanusi et al. ...... 375/267
2003/0125040 A1 * 7/2003 Walton et al. ............. 455/454

FOREIGN PATENT DOCUMENTS

| CN | 1165458 | 11/1997 |
|----|---------|---------|
| CN | 1350376 | 5/2002 |
| EP | 1300999 | 4/2003 |

* cited by examiner

*Primary Examiner*—Shuwang Liu
*Assistant Examiner*—Kabir A Timory

(57) ABSTRACT

The invention discloses a method for estimating the space correlation characteristics of noise in a time slotted CDMA system. The method comprises the steps of: making channel estimation for the received signal of each antenna of an antenna array, respectively, to obtain the original channel estimation result including values of P taps, where the value of P equals the period of the basic code used for channel estimation; separating the signal response component and the noise response component from said original channel estimation result to obtain a noise response matrix of said antenna array; and making correlation operation with said noise response matrix to obtain a space correlation matrix of noise. The invention provides a method for estimating the space correlation characteristics of noise in a time slotted CDMA system. The method is simple, effective, and of good numerical stability, displaying good performance of estimation.

6 Claims, 1 Drawing Sheet

ESTIMATION METHOD FOR SPACE CORRELATION CHARACTERISTICS OF NOISE IN A TIME SLOTTED CDMA SYSTEM

CROSS-REFERENCE TO RELATED APPLICATIONS

This application is a continuation of International Application No. PCT/CN2004/000023, filed on Jan. 7, 2004. This application claims the benefit of Chinese Application No. 03114763.1, filed on Jan. 7, 2003. The disclosures of the above applications are incorporated herein by reference.

FIELD OF THE INVENTION

The present invention relates to a method for estimating space correlation characteristics of noise in a time slotted CDMA system, especially in a time slotted CDMA system with multiple antennas, which belongs to the field of mobile communications.

BACKGROUND OF THE INVENTION

With multiple antennas, performance of a wireless communication system can be greatly improved. If not only spatial characteristics of the local cell signal, but those of interference signals of other cells are taken into account in space-time processing of a multi-antenna system, the system performance will be further improved. Said space-time processing can be implemented only when the space correlation characteristics of noise (including heat-noise and interference) have been measured and estimated, i.e. when the space correlation matrix of noise has been given. In P. Jung and J. Blanz, "Joint Detection with Coherent Receiver Antenna Diversity in CDMA Mobile Radio Systems" IEEE Trans. Veh. Tech., vol. 44, pp. 76-88, February 1995, functions and characteristics of a noise space correlation matrix in a time-slotted CDMA system with smart antenna have been discussed. Nevertheless, when implementing and emulating the technique described in the document, it is assumed that noises are not mutually correlation, i.e. without taking into account the correlation characteristics of the noises. No method for estimating the noise space correlation matrix is provided, either. In practice, the signal to be received is accumulated with the noise, i.e. e=s+n, where e is the total received signal, s is the signal component and n is the noise component. In a practical measurement and estimation of the correlation characteristics of noise, it is usually assumed that the noise component is of Gaussian distribution and uncorrelated with the signal component, so the following formula exists:

$$E\{n \cdot n^{*T}\} = E\{e \cdot e^{*T}\} - E\{s \cdot s^{*T}\}$$

Analysis and emulation results show that the above estimation algorithm of the noise space correlation matrix will be rather instable when the signal-to-noise ratio increases, making the error code rate worse rapidly. Thus, the above estimation algorithm does not satisfy the system requirement in a practical range of the signal-to-noise ratio.

SUMMARY OF THE INVENTION

Object of the invention is to solve the problem in prior art by providing a method for estimating the noise space correlation characteristics of a time slotted CDMA system so that the estimation algorithm of the noise space correlation matrix will remain stable with the error code rate of the system not getting worse even when the signal-to-noise ratio is increased. As a result, the performance requirement of the system will be satisfied in the practical range of the signal-to-noise ratio.

The invention is implemented based on the following technical scheme, and the method thereof mainly includes the following steps:

a. Making channel estimation for the received signal of each antenna of the antenna array, respectively, to obtain an original channel estimation result that includes values of P taps, where P is the period of the basic code used for channel estimation;

b. Separating the signal response component and the noise response component from said original channel estimation result, and obtaining a noise response matrix of the antenna array; and c. Making correlation operation with said noise response matrix of the antenna array to obtain a noise space correlation matrix.

Preferably, said Step b includes the following sub-steps:

b01. Computing the mean-power of each tap using the original channel estimation result of the antenna array, and judging whether the mean-power of each tap is equal to or greater than a threshold value set by said system, if yes, the value of the tap is kept as that of the processed original estimation result; otherwise the value of the tap is set to zero as that of the processed original estimation result;

b02. Subtracting the processed original estimation result from the original estimation result to obtain a noise response matrix of the antenna array that contains only the noise response component and zero.

Preferably, said Step b may also include the following sub-steps:

b11. Keeping values of P1 taps as those of the processed channel estimation result that has larger power and setting values of other taps to zero as those of the processed channel estimation result, where P1 satisfies 0<P1<P;

b12. Subtracting the processed channel estimation result obtained at Step b11 from the original channel estimation result and obtaining a noise response matrix of the antenna array that contains only the noise response component and zero.

Said Step c includes correlation operation with the formula:

$$R_{ns} = \frac{N' * N'^H}{L_1 D}$$

Where $R_{ns}$ is the noise space correlation matrix;
N' is said noise response matrix;
H represents the conjugate transpose operation;

$L_1 = P - P_1$;

$P_1$ is the number of taps of which the channel estimation values are kept;

D is the noise deteriorate factor of the channel estimation algorithm.

The invention provides a method for estimating the noise space correlation characteristics of a time slotted CDMA system by exploiting the feature of channel estimation of the time slotted CDMA system. The method is simple and effective with good value stability and features good performance of estimation in the practical range of signal-to-noise ratio of the system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
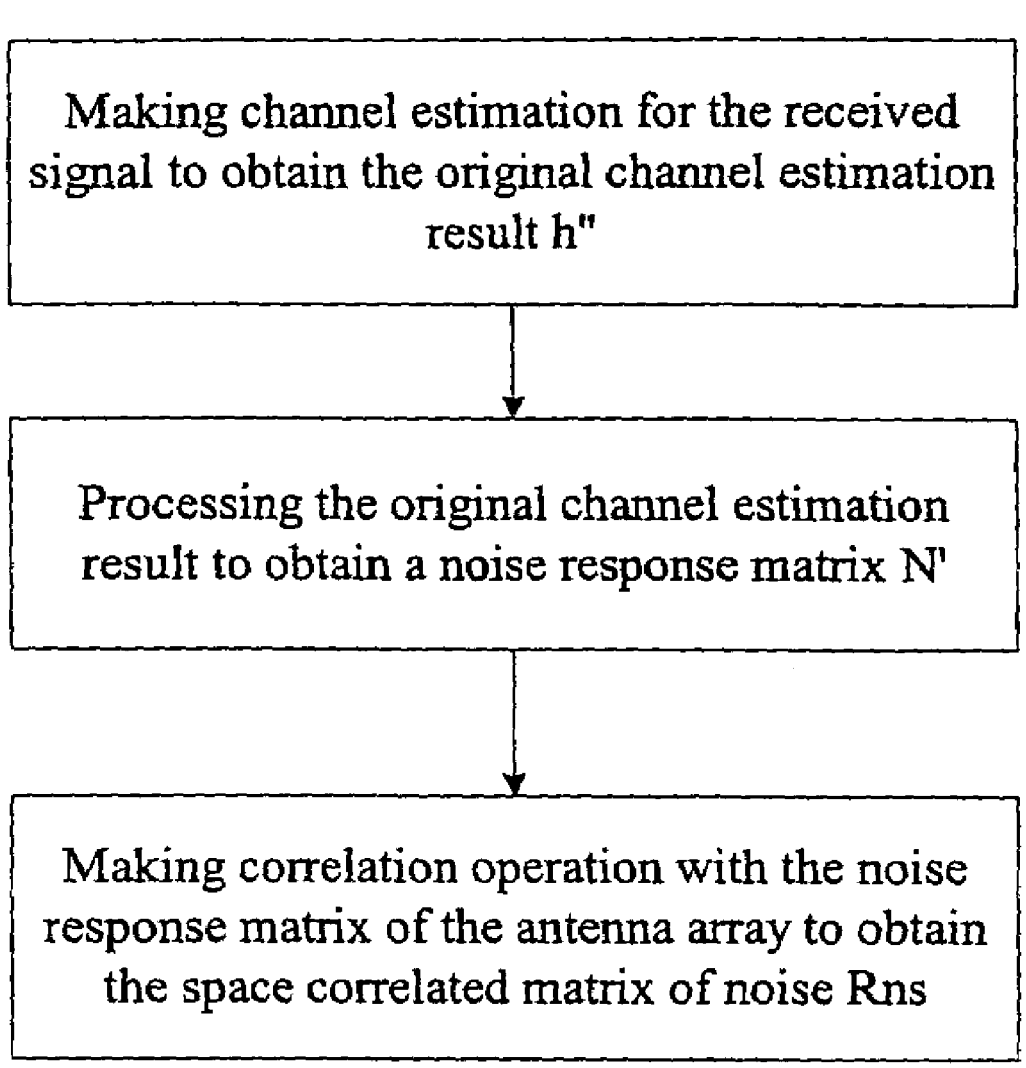
FIG. 1 shows the flowchart of the method according to the invention.

The following description of the preferred embodiment(s) is merely exemplary in nature and is in no way intended to limit the invention, its application, or uses.

The invention will be described in more detail with reference to the drawing.

When making noise property estimation by assuming that the signal and noise are not correlation, since the amount of signals for statistics is not large enough, there is a certain degree of correlation between the signal and noise, i.e. the signal component s will affect the noise property estimation. Usually the correlation is trivial and there is no significant impact from the signal component on the noise measurement when the signal-to-noise ratio is small. When the signal-to-noise ratio becomes larger, however, the impact will become much significant.

With the method of this invention, the noise correlation matrix is obtained by using the channel estimation result. By processing the original channel estimation result, the signal response component and the noise response component are separated. Therefore, correlation has less impact on the estimation of the noise space correlation characteristics in using the method of this invention.

As shown in FIG. 1, the method of this invention comprises the following steps:

Step a Making channel estimation of the received signal to obtain the original channel estimation result. Supposing the original channel estimation result of the antenna array is h″, then $$h'' = (h''^{(1)}, h''^{(2)}, \ldots, h''^{(k_a)}, \ldots, h''^{(K_a)})^T$$

Where $h''^{(k_a)}$ is the channel estimation value of the received signal at the $k_a^{th}$ antenna:

$$h''^{(k_a)} = (h''^{(k_a)}_1, h''^{(k_a)}_2, \ldots, h''^{(k_a)}_P)^T$$

Where $h''^{(k_a)}_i$ is the $i^{th}$ tap value of the channel estimation at the $k_a^{th}$ antenna, P is the period of the basic code used for channel estimation.

Step b Processing the original channel estimation result to obtain a noise response matrix of the antenna array, where the processing method is as follows:

First, processing the original channel estimation result with signal-to-noise ratio threshold method or energy sorting method.

The signal-to-noise ratio threshold method is as follows: computing the mean-power of each tap using said original channel estimation result of the antenna array, setting to zero the tap values of which the mean-powers are below the threshold and keeping the tap values of which the mean-powers are equal to or greater than the threshold; i.e. the tap values of which the mean-powers are less than the threshold are the noise component and the tap values of which the mean-powers are equal to or greater than the threshold are signal component. The number of taps of which the values are kept is represented by P1. The relationship between h′, the channel estimation result which has been processed by the signal-to-noise ratio threshold method, and h″, the original channel estimation result is shown in the following formula:

$$h'^{(k_a)}_i = \begin{cases} h''^{(k_a)}_i; & \frac{1}{K_a}\sum_{all\ k_a} \|h''^{(k_a)}_i\|^2 \geq \Gamma^2_{CHE} \\ 0; & else \end{cases},$$

$$i = 1, \cdots, P; k_a = 1, \cdots, K_a;$$

Where $\Gamma_{CHE}^2 = \epsilon \sigma_n^2$, which is the power threshold, $\epsilon > 0$ is the threshold of signal-to-noise ratio set by the system, and $\sigma_n^2$ is the measured noise power.

The energy sorting method is as follows: keeping only the taps that have larger energy in channel response and setting the values of other taps to zero. The system sets the threshold of the number of taps as P1, and 0<P1<P, i.e. the system determines the number of the channel estimation taps that need to be kept as P1 and sorts the taps based on the energy of these P1 taps, thus obtaining P1 taps of larger energy with the position sequence is: $\{i_1, i_2, \ldots, i_{P1}\}$, this is, tap values with larger channel response energy are the signal component, the rest are the noise components. The relationship between h′, the channel estimation result that has been processed by energy sorting method, and h″, the original channel estimation result is as the following formula:

$$h'^{(k_a)}_i = \begin{cases} h''^{(k_a)}_i; & i \in \{i_1, i_2, \cdots, i_{P1}\} \\ 0; & else \end{cases},$$

$$i = 1, \cdots, P; k_a = 1, \cdots, K_a;$$

Then, suppose the channel estimation having been processed by the signal-to-noise ratio threshold method or energy sorting method is h′ and the number of channel estimation taps that are kept is P1, subtract the original channel estimation result h″ with the channel estimation result h′, and a noise response matrix N′ is obtained:

$$N' = h'' - h'$$

Step c making correlation operation with the noise response matrix of the antenna array to obtain the space correlation matrix of noise, represented by $R_{nS}$, which is specifically computed by:

$$R_{ns} = \frac{N' * N'^H}{L_1 D}$$

Where H represents the conjugate transpose operation;

$$L_1 = P - P_1;$$

D is the noise deteriorate factor of the channel estimation algorithm.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for estimating space correlation characteristics of noise in a time slotted CDMA system, comprising:
   a. making channel estimation for a received signal of each antenna of an antenna array respectively to obtain an original channel estimation result including values of P taps, where the value of P equals the period of a basic code used for channel estimation, and the values of the P taps are values sampled at time spots during the period of the basic code;
   b. determining the P taps whose values contain a signal response component and the P taps whose values contain noise response component, and obtaining a noise response matrix of said antenna array from said original channel estimation result; and
   c. making correlation operation with said noise response matrix of the antenna array to obtain a space correlation matrix of noise.

2. A method according to claim 1, wherein said Step b comprises:
   b01. computing a mean-power of each one of the P taps using said original channel estimation result of the antenna array, judging whether the mean-power of each one of the P taps is equal to or greater than a preset threshold value, respectively, if yes, keeping the value of each one the P taps as that of a processed original estimation result, otherwise setting the value of each of the P taps to zero as that of a processed original estimation result;
   b02. subtracting said processed original estimation result from said original channel estimation to obtain the noise response matrix that contains only the noise response component and zero.

3. A method according to claim 2, wherein said threshold value is a threshold value of the mean power and is a product of a preset signal-to-noise ratio threshold and a noise power.

4. A method according to claim 1, wherein said Step b comprises:
   b11. keeping values of P1 taps that have larger energy as those of the processed original estimation result and setting values of each of the other P taps to zero as those of the processed original estimation result, where P1 satisfies 0<P1<P;
   b12. subtracting said processed channel estimation result processed at Step b11 from said original channel estimation result to obtain the noise response matrix of said antenna array that contains only the noise response component and zero.

5. A method according to claim 2, wherein said Step c comprises the correlation operation by means of the formula:

$$R_{ns} = \frac{N' * N'^H}{L_1 D},$$

where $R_{ns}$ is the space correlation matrix of noise;
N' is said noise response matrix;
H is the conjugate transpose operation;
$L_1=P-P_1$, which is the number of P taps whose values represent noise components;
$P_1$ is the number of P taps of which the channel estimation values are kept;
D is the noise deteriorate factor representing the deterioration of the signal-to-noise ratio introduced by a channel estimation algorithm.

6. A method according to claim 4, wherein said Step c comprises the correlation operation by means of the formula:

$$R_{ns} = \frac{N' * N'^H}{L_1 D},$$

where $R_{ns}$ is the space correlation matrix of noise;
N' is said noise response matrix;
H is the conjugate transpose operation;
$L_1=P-P_1$, which is the number of P taps whose values represent noise components;
$P_1$ is the number of P taps of which the channel estimation values are kept;
D is the noise deteriorate factor representing the deterioration of the signal-to-noise ratio introduced by a channel estimation algorithm.

* * * * *